(12) United States Patent
Berger et al.

(10) Patent No.: US 6,440,580 B1
(45) Date of Patent: Aug. 27, 2002

(54) WELDABLE, COATED METAL SUBSTRATES AND METHODS FOR PREPARING AND INHIBITING CORROSION OF THE SAME

(75) Inventors: Valentin Berger, Haan (DE); Ralph C. Gray, Butler, PA (US); Richard M. Nugent, Jr., Allison Park, PA (US); Michael J. Pawlik, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/203,833

(22) Filed: Dec. 1, 1998

(51) Int. Cl.$^7$ .................. B32B 15/08; B32B 15/18; B32B 15/20; B32B 27/08; B32B 27/38

(52) U.S. Cl. .................. 428/623; 428/629; 428/659; 428/411.1; 428/416; 428/423.1; 428/474.4; 428/480; 428/500; 428/522; 428/523

(58) Field of Search .................. 428/623, 626, 428/659, 411.1, 413, 416, 423.1, 500, 480, 522, 523, 474.4

(56) References Cited

U.S. PATENT DOCUMENTS

| | | | |
|---|---|---|---|
| 3,067,045 A | 12/1962 | McMahon | 106/14 |
| 3,382,081 A | 5/1968 | Cutter et al. | 106/14 |
| 3,395,027 A | 7/1968 | Klotz | 106/1 |
| 3,462,319 A | 8/1969 | Campbell | 148/6.16 |
| 3,687,739 A | 8/1972 | Kennedy et al. | 148/62 |
| 3,791,850 A | 2/1974 | Deshay et al. | 117/75 |
| 4,048,374 A | 9/1977 | Kotzsch et al. | 428/457 |
| 4,079,163 A | 3/1978 | Tanaka et al. | 428/328 |
| 4,157,924 A | 6/1979 | Elms et al. | 148/6.2 |
| 4,186,036 A | 1/1980 | Elms et al. | 148/6.15 R |
| 4,337,299 A | 6/1982 | van den Bergh | 428/562 |
| 4,346,143 A | 8/1982 | Young, Jr. et al. | 428/332 |
| 4,705,726 A | 11/1987 | Shindou et al. | 428/562 |
| 4,707,415 A | 11/1987 | Ikeda et al. | 428/621 |
| 4,794,050 A | 12/1988 | Campbell et al. | 428/551 |
| 4,933,056 A | 6/1990 | Corrigan et al. | 204/181.7 |
| 4,941,930 A | 7/1990 | Charles et al. | 148/260 |
| 5,034,556 A | 7/1991 | Kahle, II | 558/155 |
| 5,238,506 A | 8/1993 | Cape et al. | 148/262 |
| 5,294,265 A | 3/1994 | Gray et al. | 148/250 |
| 5,306,526 A | 4/1994 | Gray et al. | 427/309 |
| 5,530,043 A | 6/1996 | Zawacky et al. | 524/317 |
| 5,580,371 A | 12/1996 | Falberg | 106/14.12 |
| 5,584,946 A | 12/1996 | Karmaschek et al. | 148/247 |
| 5,624,978 A | * 4/1997 | Soltwedel et al. | 523/402 |
| 5,652,024 A | 7/1997 | Sanborn et al. | 427/383.7 |
| 5,653,823 A | 8/1997 | McMillen et al. | 148/247 |
| 5,760,107 A | 6/1998 | Valko et al. | 523/404 |
| 5,820,987 A | 10/1998 | Kaufman et al. | 428/413 |
| 5,908,895 A | * 6/1999 | Vogt-Birnbrich et al. | 524/591 |
| 6,008,462 A | * 12/1999 | Soltwedel | 219/91.2 |

FOREIGN PATENT DOCUMENTS

| | | |
|---|---|---|
| DE | 2105127 | * 2/1971 |
| EP | 0 157 392 | 10/1985 |
| EP | 0 291 260 A2 | 11/1988 |
| GB | 2237812 | 5/1991 |
| JP | 10-44307 | 2/1998 |
| WO | WO98/18870 | 5/1998 |

OTHER PUBLICATIONS

Derwent Account No. 1971–54768S, Feb. 1971.*
English language translation of DE 2105127, 8–1971. Aug. 1971.*
Encyclopedia of Chemical Technology, 4th Edition, vol. 16, pp. 436–441, Mar. 1991.*
vol. 18, *Encyclopedia of Chemical Technology*, 4th Edition (1996), p. 772.
CRC Handbook of Chemistry and Physics 60th edition (1980), "Periodic Table of the Elements".
vol. 18, *Encyclopedia of Chemical Technology*, 4th Edition, p. 772, Jan. 1996.
CRC Handbook of Chemistry and Physics 60th edition, "periodic Table of the Elements", Jan. 1980.

* cited by examiner

*Primary Examiner*—Paul Thibodeau
*Assistant Examiner*—Ramsey Zacharia
(74) *Attorney, Agent, or Firm*—Diane R. Meyers; Deborah M. Altman

(57) ABSTRACT

The present invention provides a weldable, coated metal substrate having a pretreatment coating including a reaction product of at least one epoxy-functional material and at least one phosphorus-containing material or amine-containing material and a weldable coating having an electroconductive pigment and a binder deposited thereon.

28 Claims, No Drawings

WELDABLE, COATED METAL SUBSTRATES AND METHODS FOR PREPARING AND INHIBITING CORROSION OF THE SAME

FIELD OF THE INVENTION

This invention relates generally to weldable, corrosion-resistant coated metal substrates and, more particularly, to metal substrates having chrome-free coatings thereon which inhibit corrosion and facilitate forming and welding of the metal substrate.

BACKGROUND OF THE INVENTION

Weldable coatings containing an electrically conductive material, such as zinc, are often used to provide an electroconductive layer on metal substrates. Zinc-rich weldable coatings can be applied directly to ferrous metal surfaces or over ferrous metal which has been treated with a chromium-containing solution. For example, U.S. Pat. No. 4,346,143 discloses a process for providing corrosion protection to ferrous metal substrates comprising etching the surface of the substrate with nitric acid followed by applying a zinc-rich coating including a binder material to the etched surface.

U.S. Pat. Nos. 4,157,924 and 4,186,036 disclose a weldable coating for metallic substrates which contains an epoxy or phenoxy resin, electroconductive pigment such as zinc and a diluent such as glycol ether. As discussed at column 7, lines 37–42, the substrate can be pretreated with a pulverulent metal-free composition containing chromate and/or phosphate ions.

Similarly, European Patent Application No. 0157392 discloses an anti-corrosive primer for metal phosphate- or chromate-treated steel which consists of a mixture of 70 to 95 weight percent zinc, aluminum, a gliding agent and a binding agent.

U.S. Pat. No. 3,687,739 discloses a weldable composite coating comprising (1) an undercoating of pulverulent metal and a hexavalent chromium-containing liquid composition and (2) a topcoating comprising a particulate, electrically conductive pigment and a binder material.

Although chromium-containing coatings provide excellent corrosion protection, particularly under zinc-rich coatings, they are toxic and present waste disposal problems. Therefore, there is a need for chromium-free treatment solutions for treating metal substrates prior to the application of a weldable coating. The treatment solution should provide corrosion resistance, maintain substrate electroconductivity for welding and provide lubricity to assist in forming and stamping.

SUMMARY OF THE INVENTION

One aspect of the present invention is a weldable, coated metal substrate comprising: (a) a metal substrate; (b) a pretreatment coating comprising a reaction product of at least one epoxy-functional material and at least one material selected from the group consisting of phosphorus-containing materials, amine-containing materials and mixtures thereof deposited upon at least a portion of a surface of the metal substrate; and (c) a weldable coating comprising an electroconductive pigment and a binder deposited upon at least a portion of the pretreatment coating.

Another aspect of the present invention is a weldable, coated metal substrate comprising: (a) a metal substrate; (b) a pretreatment coating comprising at least one ester of a phosphorus-containing material deposited upon at least a portion of a surface of the metal substrate; and (c) a weldable coating comprising an electroconductive pigment and a binder deposited upon at least a portion of the pretreatment coating.

Yet another aspect of the present invention is a method for preparing a weldable, coated metal substrate, comprising the steps of: (a) treating a surface of a metal substrate with a pretreatment coating comprising a reaction product of at least one epoxy-functional material and at least one material selected from the group consisting of phosphorus-containing materials, amine-containing materials and mixtures thereof to form a substrate having a pretreated surface; and (b) applying a weldable coating to the pretreated surface to form a weldable, coated metal substrate, the weldable coating comprising an electroconductive pigment and a binder.

Another aspect of the present invention is a method for inhibiting corrosion of a metal substrate comprising: (a) treating a surface of a metal substrate with pretreatment coating comprising a reaction product of at least one epoxy-functional material and at least one material selected from the group consisting of phosphorus-containing materials, amine-containing materials and mixtures thereof to form a substrate having a pretreated surface; and (b) applying a weldable coating to the pretreated surface to form a corrosion-resistant coated metal substrate, the weldable coating comprising an electroconductive pigment and a binder.

DETAILED DESCRIPTION OF THE PREFERRED EMBODIMENTS

The metal substrates used in the practice of the present invention include ferrous metals, non-ferrous metals and combinations thereof. Suitable ferrous metals include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Useful non-ferrous metals include aluminum, zinc, magnesium and alloys thereof, such as GALVALUME and GALFAN zinc-aluminum alloys. Combinations or composites of ferrous and non-ferrous metals can also be used.

The shape of the metal substrate can be in the form of a sheet, plate, bar, rod or any shape desired. Preferably, the shape of the metal substrate is an elongated strip wound about a spool in the form of a coil. The thickness of the strip preferably ranges from about 0.254 to about 3.18 millimeters (mm) (about 10 to about 125 mils), and more preferably about 0.3 mm, although the thickness can be greater or less, as desired. The width of the strip generally ranges from about 30.5 to about 183 centimeters (about 12 to about 72 inches), although the width can vary depending upon its intended use.

Before depositing the coatings upon the surface of the metal substrate, it is preferred to remove foreign matter from the metal surface by thoroughly cleaning and degreasing the surface. The surface of the metal substrate can be cleaned by physical or chemical means, such as mechanically abrading the surface or cleaning/degreasing with commercially available alkaline or acidic cleaning agents which are well know to those skilled in the art, such as sodium metasilicate and sodium hydroxide. A non-limiting example of a preferred cleaning agent is CHEMKLEEN 163 phosphate cleaner which is commercially available from PPG Industries, Inc. of Pittsburgh, Pa.

Following the cleaning step, the metal substrate is usually rinsed with water, preferably deionized water, in order to remove any residue. The metal substrate can be air dried using an air knife, by flashing off the water by brief exposure of the substrate to a high temperature or by passing the substrate between squeegee rolls.

In the present invention, a pretreatment coating is deposited upon at least a portion of the outer surface of the metal substrate. Preferably, the entire outer surface of the metal substrate is coated with the pretreatment coating.

The pretreatment coating facilitates adhesion of the subsequently applied weldable coating to the metal substrate. The pretreatment coating should be sufficiently thin and/or deformable to permit the heat and force applied to the weldable coating by the welding tool to drive at least a portion of the electroconductive pigment therein through the pretreatment coating to contact or essentially contact the metal substrate and provide an electrically conductive path to permit welding of the coated substrate. As used herein "essentially contact" means that the electrical resistance provided by the pretreatment coating is less than about 1 ohm. The thickness of the pretreatment coating can vary, but is generally less than about 1 micrometer, preferably ranges from about 1 to about 500 nanometers, and more preferably is about 10 to about 300 nanometers.

In a preferred embodiment, the pretreatment coating comprises a reaction product of one or more epoxy-functional materials and one or more materials selected from phosphorus-containing materials, amine-containing materials and mixtures thereof.

Useful epoxy-functional materials contain at least one epoxy or oxirane group in the molecule, such as monoglycidyl ethers of a monohydric phenol or alcohol or di- or polyglycidyl ethers of polyhydric alcohols. Preferably, the epoxy-functional material contains at least two epoxy groups per molecule and has aromatic or cycloaliphatic functionality to improve adhesion to the metal substrate. Further, it is preferred that the epoxy-functional materials be relatively more hydrophobic than hydrophilic in nature.

Examples of suitable monoglycidyl ethers of a monohydric phenol or alcohol include phenyl glycidyl ether and butyl glycidyl ether. Useful polyglycidyl ethers of polyhydric alcohols can be formed by reacting epihalohydrins with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin (preferred). Suitable polyhydric alcohols can be aromatic, aliphatic or cycloaliphatic.

Non-limiting examples of suitable aromatic polyhydric alcohols include phenols which are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane, i.e., bisphenol A (preferred).

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2, 6-hexanetriol, erythritol and trimethylolpropane; and mixtures thereof. An example of a suitable cycloaliphatic alcohol is cyclohexanedimethanol.

Suitable epoxy-functional materials have an epoxy equivalent weight ranging from about 100 to about 500, and preferably about 130 to about 250, as measured by titration with perchloric acid using methyl violet as an indicator. Useful epoxy-functional materials are disclosed in U.S. Pat. Nos. 5,294,265; 5,306,526 and 5,653,823, which are hereby incorporated by reference.

Examples of suitable commercially available epoxy-functional materials are EPON® 826 and 828 epoxy resins, which are epoxy functional polyglycidyl ethers of bisphenol A prepared from bisphenol-A and epichlorohydrin and are commercially available from Shell Chemical Company. EPON® 828 epoxy resin has a number average molecular weight of about 400 and an epoxy equivalent weight of about 185–192. EPON® 826 epoxy resin has an epoxy equivalent weight of about 178–186.

Other useful epoxy-functional materials include epoxy-functional acrylic polymers, glycidyl esters of carboxylic acids and mixtures thereof.

As discussed above, the epoxy-containing material can be reacted with one or more phosphorus-containing materials to form an ester thereof, such as an organophosphate or organophosphonate. Suitable phosphorus-containing materials include phosphoric acids, phosphonic acids and mixtures thereof.

Examples of suitable phosphonic acids include those having at least one group of the structure:

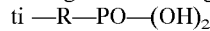

where R is —C—, preferably CH$_2$, and more preferably O—CO—(CH$_2$)$_2$—. Non-limiting examples of suitable phosphonic acids include 1-hydroxyethylidene-1,1-diphosphonic acid, methylene phosphonic acids, and alpha-aminomethylene phosphonic acids containing at least one group of the structure:

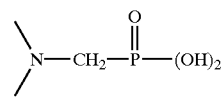

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

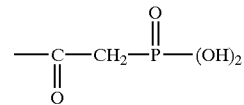

Non-limiting examples of suitable phosphonic acids include benzylaminobis(methylene phosphonic) acid, cocoaminobis (methylene phosphonic) acid, triethylsilylpropylamino (methylene phosphonic) acid and carboxyethyl phosphonic acid.

Suitable esters of phosphorus-containing materials include β-hydroxy phosphorous esters of any of the phosphoric acid or phosphonic acids discussed above, for example phosphoric acid esters of bisphenol A diglycidyl ether, benzylaminobis(methylenephosphonic) ester of bisphenol A diglycidyl ether, carboxyethyl phosphonic acid ester of bisphenol A diglycidyl ether, phenylglycidyl ether and butyl glycidyl ether; carboxyethyl phosphonic acid mixed ester of bisphenol A diglycidyl ether and butylglycidyl ether; triethoxyl silyl propylaminobis (methylenephosphonic) acid ester of bisphenol A diglycidyl ether and cocoaminobis(methylenephosphonic) acid ester of bisphenol A diglycidyl ether.

The epoxy-containing material and phosphorus-containing material are typically reacted in a equivalent ratio of about 1:0.5 to about 1:10, and preferably about 1:1 to about 1:4. The epoxy-functional material and phosphorus-containing material can be reacted together by any method well known to those skilled in the art, such as a reverse phosphatization reaction in which the epoxy-containing material is added to the phosphorus-containing material.

Typically, the reaction product of the epoxy-functional material and phosphorus-containing material has a number average molecular weight of up to about 2000, and preferably about 500 to about 1000, as measured by gel permeation chromatography using polystyrene as a standard.

In an alternative embodiment, the pretreatment coating comprises one or more esters of a phosphorus-containing material, for example such as are discussed above. Other suitable esters include the reaction product of phosphorus pentoxide as $P_4O_{10}$ and an alcohol in a 1:6 molar ratio of oxide to alcohol to produce a mixture of mono- and diphosphate esters, such as is disclosed in the 18 *Encyclopedia of Chemical Technology*, ($4^{th}$ Ed. 1996) at page 772, which is hereby incorporated by reference. Examples of suitable alcohols include aliphatic alcohols such as ethylene glycol, phenols such as bisphenol A, and cycloaliphatic alcohols.

In an alternative preferred embodiment, the reaction product can be formed from one or more epoxy-containing materials, such as are discussed above, and one or more amine-containing materials selected from primary amines, secondary amines, tertiary amines and mixtures thereof. Non-limiting examples of suitable primary amines include n-butyl amine and fatty amines such as ARMEEN 18D which is commercially available from Akzo Nobel. Suitable secondary amines include diisopropanolamine, diethanolamine and di-butyl amine. An example of a useful tertiary amine is ARMEEN DM18D dimethyl C18 tertiary amine.

Preferably, the amine-containing material comprises at least one alkanolamine or a mixture of different alkanolamines. Primary or secondary alkanolamines are preferred, however tertiary alkanolamines can be used. Preferred alkanolamines include alkanol groups containing less than about 20 carbon atoms, and more preferably less than about 10 carbon atoms. Non-limiting examples of suitable alkanolamines include methylethanolamine, ethylethanolamine, diethanolamine (preferred), methylisopropanolamine, monoethanolamine and diisopropanolamine. Preferred tertiary alkanolamines contain two methyl groups, such as dimethylethanolamine.

The epoxy-functional material and amine-containing material are preferably reacted in an equivalent ratio ranging from about 5:1 to about 0.25:1, and more preferably about 2:1 to about 0.5:1. The epoxy-functional material and amine-containing material can be reacted together by any method well known to those skilled in the art of polymer synthesis, such as solution or bulk polymerization techniques. For example, an alkanolamine can be added to an epoxy-functional material and diluent, mixed at a controlled rate and the mixture heated at a controlled temperature under a nitrogen blanket or other procedure well known to those skilled in the art for reducing the presence of oxygen during the reaction. Suitable diluents for reducing the viscosity of the mixture during the reaction include water; alcohols containing up to about 8 carbon atoms, such as ethanol or isopropanol; and glycol ethers such as the monoalkyl ethers of ethylene glycol, diethylene glycol or propylene glycol.

If a tertiary alkanolamine is used, a quaternary ammonium compound is formed. Typically, this reaction is carried out by adding all of the raw materials to the reaction vessel at the same time and heating the mixture, usually with a diluent, at a controlled temperature. Usually, an acid such as a carboxylic acid is present to ensure that the quaternary ammonium salt is formed rather than a quaternary ammonium oxide. Suitable carboxylic acids include lactic acid, citric acid, adipic acid and acetic acid (preferred). Quaternary ammonium salts are useful because they are more easily dispersed in water and can be used to form an aqueous dispersion having a pH near the desired application range.

Generally, the reaction product of the epoxy-functional material and amine-containing material has a number average molecular weight of up to about 1500, and preferably about 500 to about 750, as measured by gel permeation chromatography using polystyrene as a standard.

A treating solution of one or more of any of the reaction products discussed above can be prepared by mixing the reaction product(s) with a diluent, such as water, preferably at a temperature of about 10° C. to about 70° C., and more preferably about 15° C. to about 25° C. Preferably, the reaction product is soluble or dispersible in water diluent to the extent of at least about 0.03 grams per 100 grams of water at a temperature of about 25° C. The reaction product generally comprises about 0.05 to about 10 weight percent of the treating solution on a total weight basis.

Useful diluents include water or mixtures of water and cosolvents. Suitable cosolvents include alcohols having up to about 8 carbon atoms, such as ethanol and isopropanol; and alkyl ethers of glycols, such as 1-methoxy-2-propanol, dimethylformamide, xylene, and monoalkyl ethers of ethylene glycol, diethylene glycol and propylene glycol. Preferably, the diluent includes a propylene glycol monomethyl ether such as DOWANOL PM or dipropylene glycol monomethyl ether DOWANOL DPM, which are commercially available from Dow Chemical Company. Other useful diluents include bases such as amines which can partially or completely neutralize the organophosphate or organophosphonate to enhance the solubility of the compound. Non-limiting examples of suitable amines include secondary amines, such as diisopropanolamine (preferred), and tertiary amines such as triethylamine, dimethylethanolamine and 2-amino-2-methyl-1-propanol. Non-aqueous diluents are typically present in amount ranging from about 0.1 to about 5 weight percent on a basis of total weight of the treating solution. Water can be present in amount ranging from about 50 to about 99 weight percent on a basis of total weight of the treating solution.

Typically, water-soluble or water-dispersible acids and/or bases are used to adjust the pH of the treating solution to about 2 to about 8.5, and preferably about 2.7 to about 6.5. Suitable acids include mineral acids, such as hydrofluoric acid, fluoroboric acid, phosphoric acid, and nitric acid; organic acids, such as lactic acid, acetic acid, hydroxyacetic acid, citric acid; and mixtures thereof. Suitable bases include inorganic bases, such as sodium hydroxide and potassium hydroxide; nitrogen-containing compounds such as ammonia, triethylamine, methanolamine, diisopropanolamine; and mixtures thereof.

Preferably the treating solution further comprises a fluorine-containing material as a source of fluoride ions.

Suitable fluorine-containing materials include hydrofluoric acid, fluorosilicic acid, fluoroboric acid, sodium hydrogen fluoride, potassium hydrogen fluoride, ammonium hydrogen fluoride and mixtures thereof. Preferably, the concentration of fluorine-containing material in the pretreatment coating ranges from about 100 to about 5200 parts per million (ppm) and more preferably about 300 to about 3500 ppm. Generally, the weight ratio of reaction product to fluoride ions ranges from about 10:1 to about 55:1.

The fluorine-containing material can be applied to the metal substrate prior to application of the treating solution or included in the treating solution itself. If applied prior to application of the treating solution, the pH of an aqueous solution including the fluorine-containing material generally ranges from about 2.4 to about 4.0 and can be adjusted by adding sodium hydroxide.

The treating solution can further comprise one or more Group IVB element-containing materials. The Group IVB elements are defined by the CAS Periodic Table of the Elements as shown, for example, in the Handbook of Chemistry and Physics, (60th Ed. 1980) inside cover, which are hereby incorporated by reference, and include zirconium, titanium and hafnium. Zirconium- and titanium-containing materials are preferred.

Preferably, the Group IVB-element containing materials are in the form of metal salts or acids which are water soluble. Non-limiting examples of suitable zirconium-containing materials include fluorozirconic acid, potassium hexafluorozirconate, alkali salts of zirconium hexafluoride, amine salts of zirconium hexafluoride and mixtures thereof. Non-limiting examples of suitable titanium-containing materials include fluorotitanic acid, alkali salts of hexafluorotitanate, amine salts of hexafluorotitanate and mixtures thereof. The Group IVB-element containing materials can be the source of some or all of the fluorine-containing materials discussed above.

Generally, the Group IVB element-containing material is included in the treating solution in an amount to provide a concentration of up to about 2000 ppm, and preferably about 100 to about 1000 ppm, based upon total weight of the treating solution. Alternatively, the Group IVB-element containing material can be applied to the metal substrate prior to application of the treating solution.

The treating solution can further comprise surfactants that function as aids to improve wetting of the substrate. Generally, the surfactant materials are present in an amount of less than about 2 weight percent on a basis of total weight of the treating solution.

Preferably, the treating solution is essentially free of chromium-containing materials, i.e., contains less than about 2 weight percent of chromium-containing materials (expressed as $CrO_3$), and more preferably less than about 0.05 weight percent of chromium-containing materials. Examples of such chromium-containing materials include chromic acid, chromium trioxide, chromic acid anhydride, dichromate salts such as ammonium dichromate, sodium dichromate, potassium dichromate, and calcium, barium, magnesium, zinc, cadmium and strontium dichromate. Most preferably, the treating solution is free of chromium-containing materials.

In a preferred embodiment, the reaction product of an epoxy-functional material and a phosphorus-containing material is formed from EPON® 828 epoxy-functional resin and phosphoric acid in an equivalent ratio of about 1:1.6. The reaction product is present in the treating solution in an amount of about 5 weight percent on a basis of total weight of the treating solution. The preferred treating solution also includes diisopropanolamine, DOWANOL PM and deionized water. A small amount of hydrofluoric acid can be included to adjust the pH of the treating solution to about 5.

In an alternative preferred embodiment, the reaction product of an epoxy functional material and amine-containing material is formed from EPON® 828 epoxy-functional resin and diethanolamine. The reaction product is present in the treating solution in an amount of about 400 to about 1400 ppm based upon total weight of the treating solution. Zirconium ions are preferably present, added as fluorozirconic acid, at a level of about 75 to about 225 ppm based upon total weight of the treating solution. Other additives present include SURFYNOL® DF110 L surfactant (about 20 ppm) and monomethyl ether of dipropylene glycol (about 300 ppm). The pH of the treating solution is adjusted to about 4.0 to about 4.7 using aqueous solutions of nitric acid and sodium hydroxide.

The treating solution is applied to the surface of the metal substrate by any conventional application technique, such as spraying, immersion or roll coating in a batch or continuous process. The temperature of the treating solution at application is typically about 10° C. to about 85° C., and preferably about 15° C. to about 60° C. The pH of the preferred treating solution at application generally ranges from about 2.0 to about 7.0, and is preferably about 2.7 to about 6.5.

Continuous processes are typically used in the coil coating industry and also for mill application. The treating solution can be applied by any of these. conventional processes. For example, in the coil industry, the substrate is cleaned and rinsed and then usually contacted with the treating solution by roll coating with a chemical coater. The treated strip is then dried by heating and painted and baked by conventional coil coating processes.

Mill application of the treating solution can be by immersion, spray or roll coating applied to the freshly manufactured metal strip. Excess treating solution is typically removed by wringer rolls. After the treating solution has been applied to the metal surface, the metal can be rinsed with deionized water and dried at room temperature or at elevated temperatures to remove excess moisture from the coated substrate surface and cure any curable coating components to form the pretreatment coating. Alternately, the treated substrate can be heated at about 65° C. to about 125° C. for about 2 to about 30 seconds to produce a coated substrate having a dried residue of the pretreatment coating thereon. If the substrate is already heated from the hot melt production process, no post application heating of the treated substrate is required to facilitate drying. The temperature and time for drying the coating will depend upon such variables as the percentage of solids in the coating, components of the coating and type of substrate.

The film coverage of the residue of the pretreatment coating generally ranges from about 1 to about 1000 milligrams per square meter ($mg/m^2$), and is preferably about 10 to about 400 $mg/m^2$.

In the present invention, a weldable coating is deposited upon at least a portion of the pretreatment coating. The weldable coating comprises one or more electroconductive pigments which provide electroconductivity and cathodic protection to the weldable coating and one or more binders which adhere the electroconductive pigment to the pretreatment coating.

Non-limiting examples of suitable electroconductive pigments include zinc (preferred), aluminum, iron, graphite, diiron phosphide and mixtures thereof. Preferred zinc particles are commercially available from ZINCOLI GmbH as ZINCOLI S 620 or 520. The average particle size (equivalent spherical diameter) of the electroconductive pigment particles generally is less than about 10 micrometers, preferably ranges from about 1 to about 5 micrometers, and more preferably about 3 micrometers.

Since the metal substrates are to be subsequently welded, the weldable coating must comprise a substantial amount of electroconductive pigment, generally greater than about 10 volume percent and preferably about 30 to about 60 volume percent on a basis of total volume of electroconductive pigment and binder.

The binder is present to secure the electroconductive pigment to the pretreatment coating. Preferably, the binder forms a generally continuous film when applied to the surface of the pretreatment coating. Generally, the amount of binder can range from about 5 to about 50 weight percent of the weldable coating on a total solids basis, preferably about 10 to about 30 weight percent and more preferably about 10 to about 20 weight percent.

The binder can comprise oligomeric binders, polymeric binders and mixtures thereof. The binder is preferably a resinous polymeric binder material selected from thermosetting binders, thermoplastic binders or mixtures thereof. Non-limiting examples of suitable thermosetting materials include polyesters, epoxy-containing materials such as are discussed above, phenolics, polyurethanes, and mixtures thereof, in combination with crosslinkers such as aminoplasts or isocyanates which are discussed below. Non-limiting examples of suitable thermoplastic binders include high molecular weight epoxy resins, defunctionalized epoxy resins, vinyl polymers, polyesters, polyolefins, polyamides, polyurethanes, acrylic polymers and mixtures thereof. Examples of useful binder materials include phenoxy polyether polyols and inorganic silicates.

Particularly preferred binder materials are polyglycidyl ethers of polyhydric phenols, such as those discussed above, having a weight average molecular weight of at least about 2000 and preferably ranging from about 5000 to about 100,000. These materials can be epoxy functional or defunctionalized by reacting the epoxy groups with phenolic materials. Such binders can have epoxy equivalent weights of about 2000 to about one million. Non-limiting examples of useful epoxy resins are commercially available from Shell Chemical Company as EPON® epoxy resins. Preferred EPON® epoxy resins include EPON®1009, which has an epoxy equivalent weight of about 2300–3800. Useful epoxy defunctionalized resins include EPONOL resin 55-BK-30 which is commercially available from Shell.

Suitable crosslinkers or curing agents are described in U.S. Pat. No. 4,346,143 at column 5, lines 45–62 and include blocked or unblocked di- or polyisocyanates such as DESMODUR® BL 1265 toluene diisocyanate blocked with caprolactam, which is commercially available from Bayer, and aminoplasts such as etherified derivatives of urea-melamine- and benzoguanamine-formaldehyde condensates which are commercially available from Cytec Industries under the trademark CYMEL® and from Solutia under the trademark RESIMENE®.

Preferably, the weldable coating composition comprises one or more diluents for adjusting the viscosity of the composition so that it can be applied to the metal substrate by conventional coating techniques. The diluent should be selected so as to not detrimentally affect the adhesion of the weldable coating to the pretreatment coating upon the metal substrate. Suitable diluents include ketones such as cyclohexanone (preferred), acetone, methyl ethyl ketone, methyl isobutyl ketone and isophorone; esters and ethers such as 2-ethoxyethyl acetate, propylene glycol monomethyl ethers such as DOWANOL PM, dipropylene glycol monomethyl ethers such as DOWANOL DPM or propylene glycol methyl ether acetates such as PM ACETATE which is commercially available from Dow Chemical; and aromatic solvents such as toluene, xylene, aromatic solvent blends derived from petroleum such as SOLVESSO®. The amount of diluent can vary depending upon the method of coating, the binder components and the pigment-to-binder ratio, but generally ranges from about 10 to about 50 weight percent on a basis of total weight of the weldable coating.

The weldable coating can further comprise optional ingredients such as phosphorus-containing materials, including metal phosphates or the organophosphates discussed in detail above; inorganic lubricants such as GLEITMO 1000S molybdenum disulfide particles which are commercially available from Fuchs of Germany; extender pigments such as iron oxides and iron phosphides; flow control agents; thixotropic agents such as silica, montmorillonite clay and hydrogenated castor oil; anti-settling agents such as aluminum stearate and polyethylene powder; dehydrating agents which inhibit gas formation such as silica, lime or sodium aluminum silicate; and wetting agents including salts of sulfated castor oil derivatives such as DEHYSOL R.

Other pigments such as carbon black, iron oxide, magnesium silicate (talc), zinc oxide and corrosion inhibiting pigments including zinc phosphate and molybdates such as calcium molybdate, zinc molybdate, barium molybdate and strontium molybdate and mixtures thereof can be included in the weldable coating. Generally, these optional ingredients comprise less than about 20 weight percent of the weldable coating on a total solids basis, and usually about 5 to about 15 weight percent. Preferably, the weldable coating is essentially free of chromium-containing materials, i.e., comprises less than about 2 weight percent of chromium-containing materials and more preferably is free of chromium-containing materials.

The preferred weldable coating includes EPON® 1009 epoxy-functional resin, zinc dust, salt of a sulfated castor oil derivative, silica, molybdenum disulfide, red iron oxide, toluene diisocyanate blocked with caprolactam, melamine resin, dipropylene glycol methyl ether, propylene glycol methyl ether acetate and cyclohexanone.

The weldable coating can be applied to the surface of the pretreatment coating by any conventional method well known to those skilled in the art, such as dip coating, direct roll coating, reverse roll coating, curtain coating, air and airless spraying, electrostatic spraying, pressure spraying, brushing such as rotary brush coating or a combination of any of the techniques discussed above.

The thickness of the weldable coating can vary depending upon the use to which the coated metal substrate will be subjected. Generally, to achieve sufficient corrosion resistance for coil metal for automotive use, the applied weldable coating should have a film thickness of at least about 1 micrometer (about 0.5 mils), preferably about 1 to about 20 micrometers and more preferably about 2 to about 5 micrometers. For other substrates and other applications, thinner or thicker coatings can be used.

After application, the weldable coating is preferably dried and/or any curable components thereof are cured to form a dried residue of the weldable coating upon the substrate. The dried residue can be formed at an elevated temperature ranging up to about 300° C. peak metal temperature. Many of the binders such as those prepared from epoxy-containing materials require curing at an elevated temperature for a period of time sufficient to vaporize any diluents in the coating and to cure or set the binder. In general, baking temperatures will be dependent upon film thickness and the components of the binder. For preferred binders prepared from epoxy-containing materials, peak metal temperatures of about 150° C. to about 300° C. are preferred.

After the weldable coating has been dried and/or cured, the metal substrate can be stored or forwarded to other operations, such as forming, shaping, cutting and/or welding operations to form the substrate into parts such as fenders or doors and/or to a subsequent electrocoat or topcoating. operations. While the metal is being stored, transported or subjected to subsequent operations, the coatings protect the metal surface from corrosion, such as white and red rust, due to exposure to atmospheric conditions.

Since the coated metal substrate prepared according to the present invention is electroconductive, top coating of the coated substrate by electrodeposition is of particular interest. Compositions and methods for electrodepositing coatings are well known to those skilled in the art and a detailed discussion thereof is not believed to be necessary. Useful compositions and methods are discussed in U.S. Pat. No. 5,530,043 (relating to anionic electrodeposition) and U.S. Pat. Nos. 5,760,107, 5,820,987 and 4,933,056 (relating to cationic electrodeposition) which are hereby incorporated by reference.

The weldable coated metal substrate optionally can be coated with a metal phosphate coating, such as zinc phosphate, which is deposited upon at least a portion of the weldable coating. Methods of application and compositions for such metal phosphate coatings are disclosed in U.S. Pat. Nos. 4,941,930 and 5,238,506, which are hereby incorporated by reference.

The pretreatment coating and weldable coating provide the metal substrate of the present invention with improved adhesion and flexibility and resistance to humidity, salt spray corrosion and components of subsequently applied coatings. In addition, the disposal and use problems associated with chromium can be reduced or eliminated.

The present invention will now be illustrated by the following specific, non-limiting examples. All parts and percentages are by weight unless otherwise indicated.

EXAMPLES

The following examples show the use of pretreatment coatings comprising epoxy esters of phosphoric acid applied to steel substrates which are subsequently coated with weldable coatings according to the present invention.

Preparation and Coating of Substrates

Various types of steel panels, listed in Tables 1–2 were obtained from ACT Laboratories. Each panel was about 10.16 centimeters (cm) (4 inches) wide, about 30.48 cm (12 inches) long and about 0.76 to 0.79 mm (0.030 to 0.031 inches) thick. The steel panels were subjected to an alkaline cleaning process by immersion in a 2% by volume bath of CHEMKLEEN 163 which is available from PPG Industries, Inc. at a temperature of 60° C. (140° F.) for 30 seconds. The panels were removed from the alkaline cleaning bath, rinsed with room temperature water (about 21° C. (70° F.)) for 5 seconds and dried with an "air-knife".

As shown in Tables 1–2, several of the cleaned panels were left untreated. The remainder of the panels were treated with one of the following pretreatment coatings: (1) a solution of NUPAL 435[1], which includes an epoxy ester of phosphoric acid and fluoride according to the present invention (Example 1); (2) a solution of NUPAL 510[2], which includes an epoxy ester of phosphoric acid, fluoride and fluorozirconate according to the present invention (Example 2); or a chromium-based pretreatment, BONDER 1415A, available from Henkel Corporation. All panels treated with BONDER 1415A had a measured elemental chromium weight of between 10 mg/m$^2$ and 20 mg/m$^2$ (1.1 mg/ft$^2$ and 2.1 mg/ft$^2$).

[1]NUPAL 435 organophosphate solution is commercially available from PPG Industries, Inc. The concentration of the organophosphate was 1% by weight based on total weight of the solution.
[2]NUPAL 510 organophosphate solution is commercially available from PPG Industries, Inc. The concentration of the organophosphate was 5% by weight based on total weight of the solution.

All pretreatment solutions were applied via roll coat application at 3.4×10$^5$ Pa (50 psi) and a rate of 56.4 meters/min (185 ft/min). Panels were immediately baked for 15 seconds to a peak metal temperature of 110° C.±6° C. (230° F.±10° F.). After drying, all panels were coated with BONAZINC 3000 zinc-rich, epoxy resin-containing weldable coating, which is commercially available from PPG Industries, Inc., on one side of the panel with a #5 drawbar (resulting in a dried film thickness of between 2.9 microns and 3.2 microns) and baked at 316° C. (600° F.) for about 1–2 minutes until a peak metal temperature of 254° C. (490° F.) was achieved. The panels were then cooled at ambient temperature.

Adhesion and Corrosion Testing

To determine the adhesion of the coating systems under fabrication conditions, panels coated as described above and as summarized in Tables 1 and 2 were coated with about 1064 mg/m$^2$ (about 100 mg/ft$^2$) of Quaker 61AUS mill oil and drawn into square cups 25.4 mm (1 inch) high and 36.5 mm (1$^7$⁄$_{16}$ inches) along each side. Adhesion performance was evaluated on areas of the cups where deformation and strain was greatest (sides and top/bottom corners). The percentage of area in which complete delamination occurred for each sample is shown in Tables 1 and 2 below. After the initial adhesion evaluation, cups were placed in corrosion testing for the respective durations specified in Tables 1 and 2. Relative ratings according to the percentage of red rust which formed over the entire tested surface of the cup, as well as the degree of white stain, are shown in Tables 1 and 2.

Two sets of corrosion tests were conducted on the fabricated cups. Each sample was subjected to a minimum of 5 cycles and a maximum of 40 cycles according to GM 9540P Cycle B Corrosion Test. Salt spray resistance was determined by exposing samples of unscored cups and samples in which the film is scored with a carbide tip scriber instrument to expose the base metal. The samples were then exposed to a 5% salt solution for either 100 hours or 1000 hours as reported in Tables 1–2 and according to ASTM B-117.

TABLE 1

| SUBSTRATE TESTED | TREATMENT | INITIAL ADHESION CUPS % Coating Loss[1] | SALT SPRAY TESTING CUPS % RED RUST (Degree of White Stain)[2,3] | CYCLE B TESTING CUPS % RED RUST (Degree of White Stain)[2,4] |
|---|---|---|---|---|
| ACT EZG-60G 2-sided Electrogalvanized Steel | Clean only | 30 to 50% | 50% (Heavy) | 25% (Moderate) |
| ACT EZG-60G 2-sided Electrogalvanized Steel | Example 1 | 5 to 10% | 4% (Moderate) | 6% (Light/Mod) |
| ACT EZG-60G 2-sided Electrogalvanized Steel | Example 2 | <5% | <1% (Moderate) | 8% (Light/Mod) |
| ACT EZG-60G 2-sided Electrogalvanized Steel | Bonder 1415A | 5 to 10% | 10% (Mod/Heavy) | 4% (Light/Mod) |
| ACT HDG-G70 70U Hot dipped galvanized Steel | Clean only | 40 to 60% | 15% (Moderate) | 1% (Light/Mod) |
| ACT HDG-G70 70U Hot dipped galvanized Steel | Example 1 | 5 to 10% | 7% (Light) | 2% (Light/Mod) |
| ACT HDG-G70 70U Hot dipped galvanized Steel | Example 2 | 5 to 10% | 5% (Light) | 2% (Light/Mod) |
| ACT HDG-G70 70U Hot dipped galvanized Steel | Bonder 1415A | 5 to 10% | 10% (Moderate) | 1% (Light/Mod) |
| ACT HDA Zn/Fe-A45 2 side Hot dipped galvanneal Steel | Clean only | 5 to 10% | 10% (Light/Mod) | 8% (Light) |
| ACT HDA Zn/Fe-A45 2 side Hot dipped galvanneal Steel | Example 1 | <5% | 4% (Light/Mod) | 4% (Very Light) |
| ACT HDA Zn/Fe-A45 2 side Hot dipped galvanneal Steel | Example 2 | <5% | 6% (Light/Mod) | 20% (Light) |
| ACT HDA Zn/Fe-A45 2 side Hot dipped galvanneal Steel | Bonder 1415A | <5% | 8% (Light/Mod) | 30% (Light) |

[1] Values based on the range over six cups.
[2] Values based on the average of two cups.
[3] EZG, HDG and HDA cups and panels were exposed for 1000 hours. CRS cups were exposed for 100 hours.
[4] EZG and HDG cups were exposed for 40 cycles. HDA cups were exposed for 30 cycles. CRS cups were exposed for 5 cycles.

TABLE 2

| SUBSTRATE TESTED | TREATMENT | INITIAL ADHESION CUPS % Coating Loss[1] | SALT SPRAY TESTING CUPS % RED RUST[2,3] | CYCLE B TESTING CUPS % RED RUST[2,4] |
|---|---|---|---|---|
| ACT CRS (unpolished) Cold Rolled Steel | Clean only | 40 to 60% | 70% (N/A) | 75% (N/A) |
| ACT CRS (unpolished) Cold Rolled Steel | Example 1 | 5 to 10% | 95% (N/A) | 85% (N/A) |
| ACT CRS (unpolished) Cold Rolled Steel | Example 2 | 5 to 10% | 90% (N/A) | 85% (N/A) |
| ACT CRS (unpolished) Cold Rolled Steel | Bonder 1415A | 5 to 10% | 80% (N/A) | 80% (N/A) |

As shown in Tables 1 and 2 above, the steel cups of Examples 1 and 2 (coated with a pretreatment coating and weldable coating according to the present invention) had superior initial coating adhesion compared to the controls (coated only with the weldable coating) and comparable initial adhesion compared to steel cups coated with a commercially available chromium-containing pretreatment.

Also, the steel cups of Examples 1 and 2 prepared according to the present invention had generally improved salt spray corrosion resistance compared to the clean only controls and steel cups coated with a commercially available chromium-containing pretreatment for electrogalvanized steel, hot dipped galvanized steel and hot dipped GAL-VANNEAL steel. For electrogalvanized steel, the steel cups of Examples 1 and 2 prepared according to the present invention had superior Cycle B testing results when compared to the clean only controls and comparable performance to steel cups coated with a commercially available chromium-containing pretreatment.

Resistance Welding Testing

The weldability of samples of the coated panels was evaluated by determining the lobe width of each weld using a minimum acceptable nugget diameter of 3.6 mm. The lobe width is the difference in amount of current (thousands of amps) between the amount of welding current needed to form a spot weld of a minimum acceptable size and the amount of welding current that is used before "expulsion" occurs. Expulsion is the violent expulsion of molten metal from the weld, typically accompanied by an audible sound and flying sparks. It is desirable for this difference, or lobe width, to be as large as possible.

After two panels of metal were spot welded, they were tested destructively by peeling the two panels apart. Typically, a button or "nugget" remained on one of the panels, and a hole was pulled out of the other panel. The minimum acceptable diameter of the nugget was determined by the thickness of the two panels and the face diameter of the electrodes. The coated metal panels or sheets of the present invention were 0.76 mm (0.030 inches) thick and the electrodes used had a face diameter of 5 mm. For these welding parameters, a minimum acceptable nugget is 3.6 millimeters in diameter. For nuggets that were not circular, the weld nugget diameter was determined by averaging the shortest dimension of the weld nugget with its longest dimension.

Each coated panel was cut into samples approximately 50.8 mm by 25.4 mm (2 inches by 1 inch) for testing. The coated samples were aligned with the coated surfaces of each sample facing each other on the inside, or "faying surface" of the weld. Each pair of samples was welded together with two welds, each weld located approximately 12.7 mm (½ inch) from either end, using the same amount of welding current for each weld. The copper welding tips were pressed against the metal samples on the uncoated outside surfaces thereof. A resistance spot welder capable of generating at least 500 pounds of force and at least 10 kiloamps of welding current was used to weld the panels together. The welding tips were class II copper, 45° truncated cones with a face diameter of 5 mm.

For each of the panels, about 25 to 30 welds were made to find the approximate amount of current suitable for the combination of metal type and pretreatment. Then, the highest amount of welding current that could be used without expulsion on the second weld was determined. Immediately after this determination, successive pairs of welds were made on the samples at lower amounts of current to determine the smallest amount of current that could make a weld of at least 3.6 mm in diameter. The welding conditions used were: 450 pounds of force, 11 cycles (11/60 second) of weld current duration, and 5 cycles (5/60 second) of hold time after the weld current was applied. The second weld of each pair of welds was used to determine nugget size and for observing expulsion. In all cases, only the second weld of a pair was considered to be the test weld. The difference between the maximum current without expulsion and minimum current that was used to make a weld of 3.6 millimeters or larger was calculated to be the lobe width. Values of lobe width for each Example are set forth in Table 3 below.

TABLE 3

| SUBSTRATE TESTED | TREATMENT | Maximum Current Without Expulsion (kiloamps)[2,4] | Minimum Current for 3.6 mm Diameter Nugget (kiloamps)[2,4] | Lobe Width (kiloamps)[3,5] |
|---|---|---|---|---|
| ACT EZG-60G 2-sided Electrogalvanized Steel | Clean only | 8.9 | 8.2 | 0.7 |
| ACT EZG-60G 2-sided Electrogalvanized Steel | Example 1 | 8.4 | 8.1 | 0.3 |
| ACT EZG-60G 2-sided Electrogalvanized Steel | Example 2 | 8.5 | 8.1 | 0.4 |
| ACT EZG-60G 2-sided Electrogalvanized Steel | Bonder 1415A | 8.5 | 8.1 | 0.4 |
| ACT HDG-G70 70U Hot dipped galvanized Steel | Clean only | 8.9 | 8.1 | 0.8 |
| ACT HDG-G70 70U Hot dipped galvanized Steel | Example 1 | 8.9 | 8.3 | 0.6 |
| ACT HDG-G70 70U Hot dipped galvanized Steel | Example 2 | 8.7 | 8.2 | 0.5 |
| ACT HDG-G70 70U Hot dipped galvanized Steel | Bonder 1415A | 9.0 | 8.2 | 0.8 |
| ACT HDA Zn/Fe-A45 2 side Hot dipped galvanneal Steel | Clean only | 8.0 | 6.8 | 1.2 |
| ACT HDA Zn/Fe-A45 2 side Hot dipped galvanneal Steel | Example 1 | 7.9 | 6.8 | 1.1 |
| ACT HDA Zn/Fe-A45 2 side Hot dipped galvanneal Steel | Example 2 | 8.8 | 7.5 | 1.3 |
| ACT HDA Zn/Fe-A45 2 side Hot dipped galvanneal Steel | Bonder 1415A | 8.0 | 6.9 | 1.1 |

As shown in Table 3, samples of various types of steel coated with weldable coatings according to the present invention had comparable lobe width values to a sample pretreated with a commercially available chromium-containing pretreatment.

Similar weld testing was performed on samples of British Steel and Voest Alpine steel which were cleaned and coated as discussed above. One sample was pretreated with GRANODINE 4513 chromium-containing pretreatment, which is commercially available from Henkel. MB-Standard electrodes F16 having a diameter of 5.5 mm flat were used to perform the welding. The welding time was conducted according to DVS 2902.Part 4 and electrode power was conducted according to DVS 2904 Part 4 plus maximum 25%. The results of this weld testing are set forth in Table 4 below.

TABLE 4

| COMMERCIAL SUBSTRATE TESTED | TREATMENT | Lobe Width (kiloamps) |
| --- | --- | --- |
| British Steel Electrogalvanized Steel | Example 1 | 2.6 |
| British Steel Electrogalvanized Steel | Bonder 1415A | 1.5 |
| Voest Alpine 75/75 Electrogalvanized Steel | Example 1 | 1.6 |
| Voest Alpine 75/75 Electrogalvanized Steel | Example 2 | 1.6 |
| Voest Alpine 75/75 Electrogalvanized Steel | GRANODINE 4513 | 0.9 |

As shown in Table 4, electrogalvanized steel samples coated with weldable coatings according to the present invention had higher lobe width values than samples pretreated with two commercially available chromium-containing pretreatments.

The metal substrates of the present invention have coatings thereon which can provide corrosion protection in areas which are difficult for conventional electrocoat treatments to reach. This enhanced corrosion protection can reduce or eliminate the need for wax fillers and sealers in automotive parts, such as door hem flanges. The coatings maintain electroconductivity of the metal substrate to facilitate welding or electrodeposition of subsequent coatings. The coatings also provide lubricity to assist in forming and stamping of parts prepared from the coated metal substrate. These coatings can be applied at the metal forming or steel mill to protect the coated substrate from corrosion and damage during transportation and fabricating operations.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A weldable, coated metal substrate comprising:
   (a) a bare metal substrate;
   (b) a pretreatment coating having less than 0.05 weight percent of chromium-containing materials, the pretreatment coating comprising a β-hydroxy phosphorous ester that is the reaction product of at least one epoxy-functional material and a phosphorus-containing material deposited upon at least a portion of a surface of the metal substrate; and
   (c) a weldable coating comprising an electroconductive pigment and a binder deposited upon at least a portion of the pretreatment coating.

2. The coated metal substrate according to claim 1, wherein the metal substrate comprises a ferrous metal.

3. The coated metal substrate according to claim 2, wherein the ferrous metal is selected from the group consisting of iron, steel, and alloys thereof.

4. The coated metal substrate according to claim 3, wherein the ferrous metal comprises steel selected from the group consisting of cold rolled steel, galvanized steel, electrogalvanized steel, stainless steel, and combinations thereof.

5. The coated metal substrate according to claim 1, wherein the metal substrate comprises a non-ferrous metal selected from the group consisting of aluminum, zinc, magnesium, and alloys thereof.

6. The coated metal substrate according to claim 1, wherein the epoxy-functional material is the condensation reaction product of an epihalohydrin with a polyhydric alcohol.

7. The coated metal substrate according to claim 1, wherein the phosphorus-containing material is selected from the group consisting of phosphoric acids, phosphonic acids, and mixtures thereof.

8. The coated metal substrate according to claim 1, wherein the reaction product is selected from the group consisting of epoxy esters of phosphoric acid, epoxy esters of phosphonic acid, and mixtures thereof.

9. The coated metal substrate according to claim 1, wherein the pretreatment coating further comprises at least one secondary amine.

10. The coated metal substrate according to claim 9, wherein the secondary amine is diisopropanol amine.

11. The coated metal substrate according to claim 1, wherein the pretreatment coating further comprises a fluorine-containing material.

12. The coated metal substrate according to claim 11, wherein the fluorine-containing material is selected from the group consisting of hydrofluoric acid, fluorosilicic acid, sodium hydrogen fluoride, potassium hydrogen fluoride, ammonium hydrogen fluoride, and mixtures thereof.

13. The coated metal substrate according to claim 1, wherein the pretreatment coating further comprises at least one Group IVB element-containing material.

14. The coated metal substrate according to claim 13, wherein the Group IVB element-containing material is a zirconium-containing material selected from the group consisting of fluorozirconic acid, potassium hexafluorozirconate, alkali salts of zirconium hexafluoride, amine salts of zirconium hexafluoride, and mixtures thereof.

15. The coated metal substrate according to claim 13, wherein the Group IVB element-containing material is a titanium-containing material selected from the group consisting of fluorotitanic acid, alkali salts of hexafluorotitanate, amine salts of hexafluorotitanate, and mixtures thereof.

16. The coated metal substrate according to claim 1, wherein the electroconductive pigment is selected from the group consisting of zinc, aluminum, iron, graphite, diiron phosphide, and mixtures thereof.

17. The coated metal substrate according to claim 1, wherein the binder is selected from the group consisting of oligomeric binders, polymeric binders, and mixtures thereof.

18. The coated metal substrate according to claim 1, wherein the binder is selected from the group consisting thermosetting binders, thermoplastic binders, and mixtures thereof.

19. The coated metal substrate according to claim 18, wherein the binder comprises a thermosetting binder selected from the group consisting of polyesters, epoxy-containing materials, phenolics, aminoplasts, polyurethanes and mixtures thereof.

20. The coated metal substrate according to claim 19, wherein the binder comprises an epoxy-containing material which is a polyglycidyl ether of bisphenol A.

21. The coated metal substrate according to claim 19, wherein the weldable coating further comprises a crosslinker for crosslinking the thermosetting binder.

22. The coated metal substrate according to claim 18, wherein the binder comprises a thermoplastic binder selected from the group consisting of vinyl polymers, polyesters, polyolefins, polyamides, polyurethanes, acrylic polymers, and mixtures thereof.

23. The coated metal substrate according to claim 1, wherein the weldable coating further comprises a phosphorus-containing material.

24. The coated metal substrate according to claim 1, wherein the weldable coating further comprises an inorganic lubricant.

25. The coated metal substrate according to claim 24, wherein the inorganic lubricant is molydenum disulfide.

26. The coated metal substrate according to claim 1, wherein the coated metal substrate further comprises a metal phosphate coating deposited upon at least a portion of the weldable coating.

27. The coated metal substrate according to claim 1, wherein the coated metal substrate further comprises an electrodeposited coating deposited upon at least a portion of the weldable coating.

28. A weldable, coated metal substrate comprising:

(a) a bare metal substrate;

(b) a pretreatment coating having less than 0.05 weight percent of chromium-containing materials, the pretreatment coating comprising a reaction product of at least one epoxy-functional material and a phosphorus-containing material deposited upon at least a portion of a surface of the metal substrate; and (c) a weldable coating comprising an electroconductive pigment and a binder deposited upon at least a portion of the pretreatment coating, wherein the epoxy functional material is a polyglycidyl ether of bisphenol A.

* * * * *